United States Patent [19]

Wagner

[11] Patent Number: 5,450,835
[45] Date of Patent: Sep. 19, 1995

[54] OIL SEPARATOR FOR REDUCING OIL LOSSES FROM CRANKCASE VENTILATION

[75] Inventor: Richard A. Wagner, Columbus, Ind.

[73] Assignee: Cummins Engine Company, Inc., Columbus, Ind.

[21] Appl. No.: 340,396

[22] Filed: Nov. 15, 1994

[51] Int. Cl.$^6$ ............................................. F02B 25/06
[52] U.S. Cl. ...................................... 123/573; 55/337
[58] Field of Search ................ 123/41.86, 573; 55/337

[56] References Cited

U.S. PATENT DOCUMENTS

| | | | |
|---|---|---|---|
| 1,175,948 | 3/1916 | French | 210/165 |
| 2,332,188 | 10/1943 | Andrews | 210/165 |
| 3,721,069 | 3/1973 | Walker | 55/319 |
| 4,269,607 | 5/1981 | Walker | 123/573 |
| 4,627,406 | 12/1986 | Namiki et al. | 123/573 |
| 4,920,930 | 5/1990 | Sakano et al. | 123/41.86 |
| 5,254,147 | 10/1993 | Finke | 55/337 |

*Primary Examiner*—Noah P. Kamen
*Attorney, Agent, or Firm*—Sixbey, Friedman, Leedom & Ferguson

[57] ABSTRACT

An oil separator for reducing oil carryover from the vent port of the crankcase of an internal combustion engine, such as a diesel engine is provided. The separator includes a cylindrical housing filled with a filtration material and having both an inlet and an outlet in its upper portion and a downwardly disposed, frustro-conical wall that defines an annular chamber between its outer surface and the inner walls of the housing. The annular chamber defines a helical flow path through the filtration material in the housing for a stream of oil-laden air admitted through the inlet of the housing. Oil droplets are removed from the stream of air as it moves through the helical path both by impingement against the filtration material, and the by centrifugal impingement against the inner walls of the housing. At the end of the helical path, the stream of air is directed along a hairpin turn through an opening in the frustro-conical wall and from thence into a double-back path before exiting the housing, thereby removing still more entrained oil droplets. The resulting filtered stream of air may be directed into the engine draft tube or the air filter by means of a pipe. The separator also includes an oil drain conduit for conducting liquid oil collected by the filtration material into the oil pan of the engine at a level lower than the operating level of the oil within the pan for uninhibited drainage.

20 Claims, 3 Drawing Sheets

OIL SEPARATOR FOR REDUCING OIL LOSSES FROM CRANKCASE VENTILATION

BACKGROUND OF THE INVENTION

This invention generally concerns gas/liquid separation devices, and is particularly concerned with an oil separator for separating the oil droplets entrained in vent air expelled from the crankcase of an internal combustion engine.

Modern automotive engines including both diesel and gasoline engines are frequently provided with a ventilation system for venting air circulating within the crankcase of the engine. During the operation of the engine, small amounts of hot combustion gases leak past the piston rings and through the oil circulating within the crankcase to create a pressurized mixture of air, exhaust gases and atomized oil. If left unvented, the resulting gas pressure could force the oil in the crankcase to penetrate the seals between the crankshaft and the engine block, not only causing an undesirable loss of engine oil, but also pollution in the form of a constant oil dribble from the vehicle. To mitigate these problems, the crankcases of some internal combustion engines are provided with baffles in front of their vent openings for condensing and at least partially recirculating some of the oil entrained in the vent gases. The vent gases are then discharged through a draft tube mounted on the outside of the crankcase. Such a venting system prevents pressurized oil from breaking through the seals of the crankcase and further reduces some of the oil losses that result from the venting, but unfortunately allows a significant amount of oil to escape out of the draft tube and dribble out of the engine.

Devices for separating the oil from the air stream discharged by crankcase venting systems are known in the art. However, none of these separators thus far has provided an entirely satisfactory solution to the aforementioned problems. The aircraft industry has long used oil separators in connection with prop plane engines that are substantially more efficient than the baffle and draft tube systems previously described. However, the complex structure and consequent high expense of such separators (which cost upwards of several hundred dollars) render them economically impractical for use in car and truck engines. Additionally, none of these prior art separators is capable of satisfactorily recirculating filtered oil back to the oil system of the engine. While one separator is known which attempts to recirculate collected oil back to the crankcase, the applicant has observed that the lack of a positive pressure differential between the drain line of the separator and the air within the crankcase prevents an effective recirculation.

Clearly, what is needed is a practical and economical device that is capable of separating substantially all of the oil droplets entrained in the gases expelled from an engine crankcase ventilation system, and effectively recirculating the separated oil back to the oil supply of the engine. Such an oil separator should be easily retrofittable onto a variety of different makes of internal combustion engines. Ideally, the oil separator should constitute part of a completely "closed" system which, when installed in an engine, eliminates all unwanted emissions of both vaporized and liquid engine oil.

SUMMARY OF THE INVENTION

The oil separator of the invention eliminates or at least ameliorates all of the aforementioned problems associated with the prior art while fulfilling the aforementioned criteria. To this end, the oil separator comprises a housing having an inlet for receiving a stream of oil laden air from a crankcase vent system and an outlet for discharging filtered air, a filtration material disposed within the interior of the housing, and a frustro-conical wall disposed around and spaced apart from the inner wall of the housing for defining an annular chamber which guides the oil-laden air around a helical flow path through the filtration material. The frustro-conical wall includes a larger diametered end which is connected around the inner edge of the top of the housing, and a smaller diametered end which serves as an outlet for discharging the resulting stream of filtered air.

As air discharged from the crankcase vent system flows around the helical path defined by the annular chamber, oil droplets entrained in the air become separated from the air stream both by impingement against the filtration material, and by centrifugal impingement against the inner walls of the housing. At the end of the helical path, the air flowing through the housing is forced to turn 180° from a generally downward direction up through the open, smaller-diametered end of the frustro-conical wall before exiting the housing through the outlet. Moreover, since the small-diametered end of the frustro-conical wall is spaced apart from the housing outlet, most of the air exiting the small-diametered end has the opportunity to double-back at least once before leaving through the housing outlet. The helical path provided by the annular chamber, in combination with the "hairpin turn" defined by the open, small-diametered end of the frustro-conical wall and the double-back path defined in the space between the small-diametered end and the housing outlet not only forces the oil-laden air entering the housing to make multiple passes through the filtration material; it further adds components of cyclonic and inertial, tortuous path type separation of the oil droplets from the vent of air in which they are entrained.

An oil drain is provided at the bottom of the housing to recirculate collected oil back into the lubrication system of the engine. In the preferred embodiment, the oil drain includes a conduit leading from the bottom of the housing to the oil pan of the engine. The end of the conduit disposed in the oil pan is deliberately placed below the operating oil level in the pan to insure a positive pressure differential and hence an uninhibited flow of oil from the separator to the oil pan.

To render the separator a "closed system" within the engine in which it is mounted, filtered air exiting the discharge outlet of the housing is directed into the air filter of the engine by way of a pipe. The oil removal efficiency of the separator is high enough so that the life span of the air filter is not significantly shortened by the any residual oil remaining in the filtered air discharged into it.

BRIEF DESCRIPTION OF THE SEVERAL FIGURES

Figure 3:
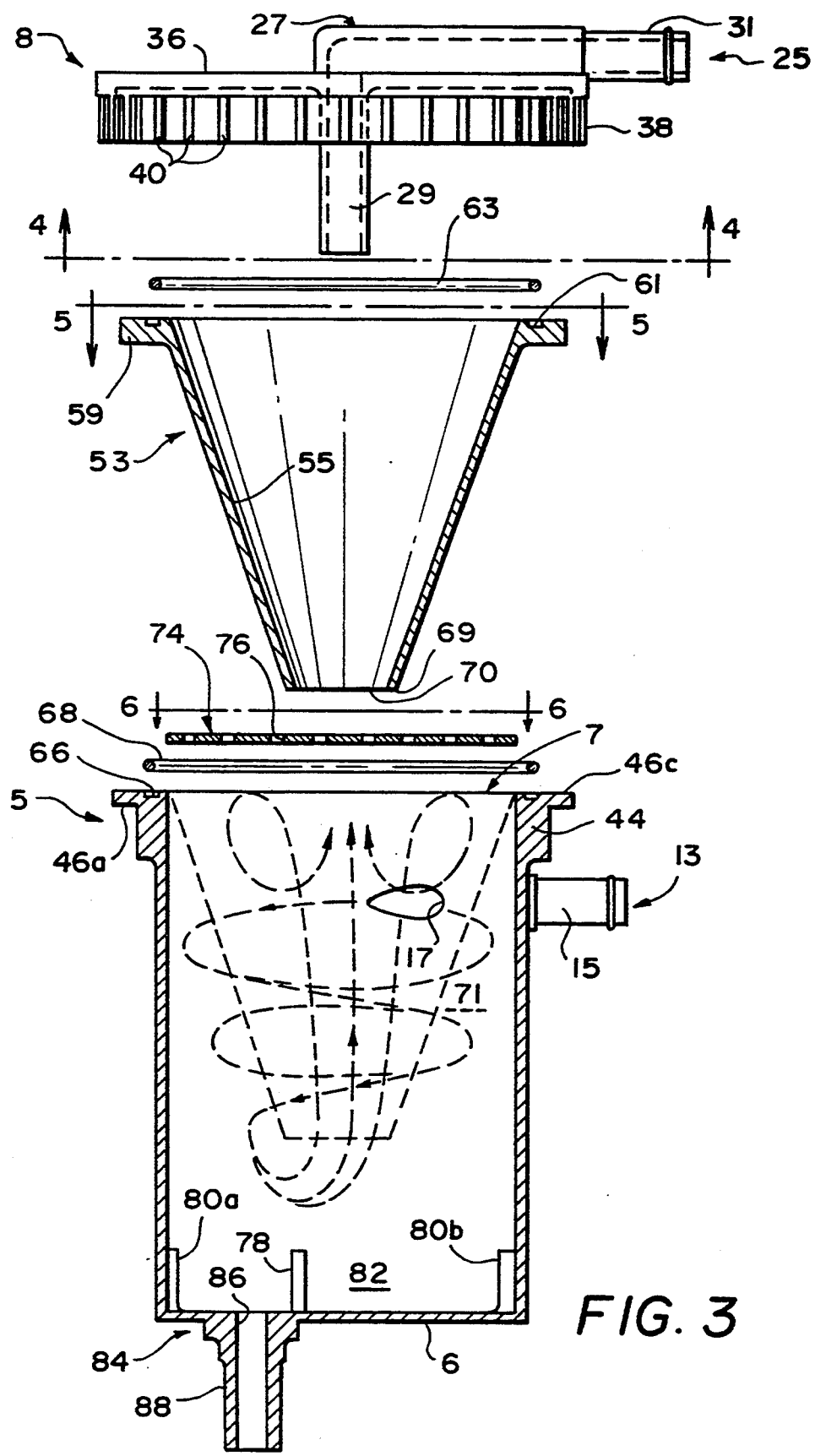
FIG. 3 is an exploded partial side cross sectional view of the air-oil separator of the invention, illustrating how the various components are assembled, and further illustrating the combination helical and double-back path followed by vent gasses that enter the separator.
Figure 5:
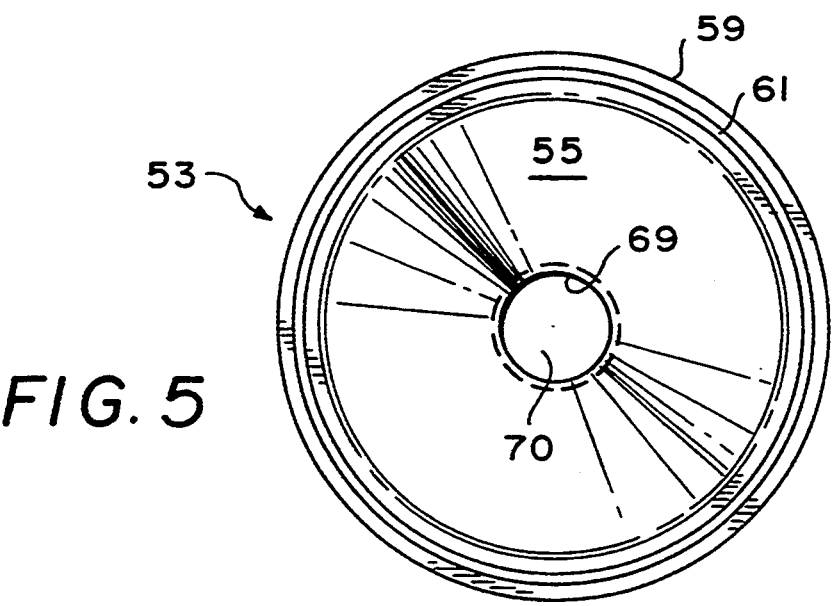
Figure 6:
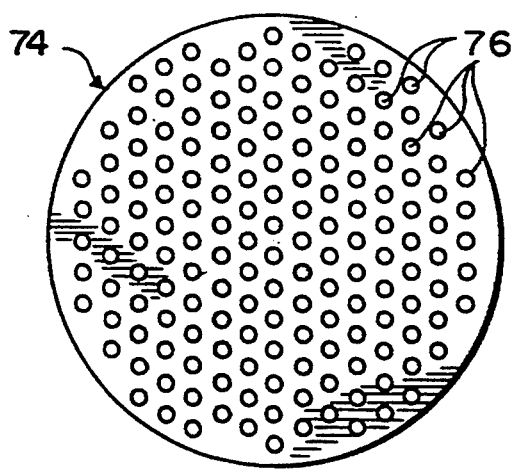

FIG. 5 is a plan view of the frustro-conical wall assembly 53 illustrated in FIG. 3 along the line 5—5, and FIG. 6 is a plan view of the perforated plate illustrated in FIG. 3 along the line 6—6.

DETAILED DESCRIPTION OF THE PREFERRED EMBODIMENT

Figure 1:
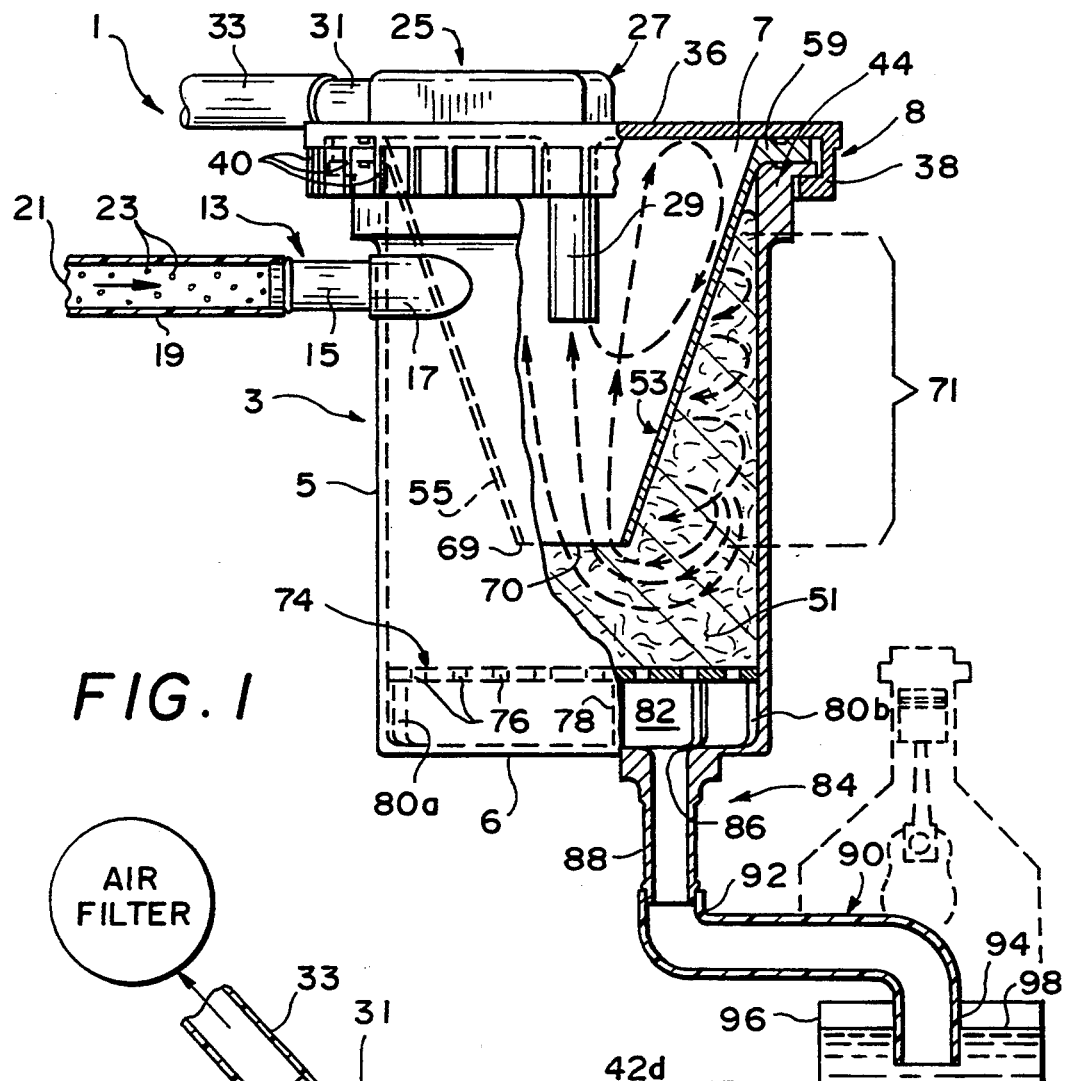
FIG. 1 is a cross sectional side view of the air-oil separator of the invention, schematically illustrating how it drains the oil it collects into the oil pan of an engine.
Figure 2:
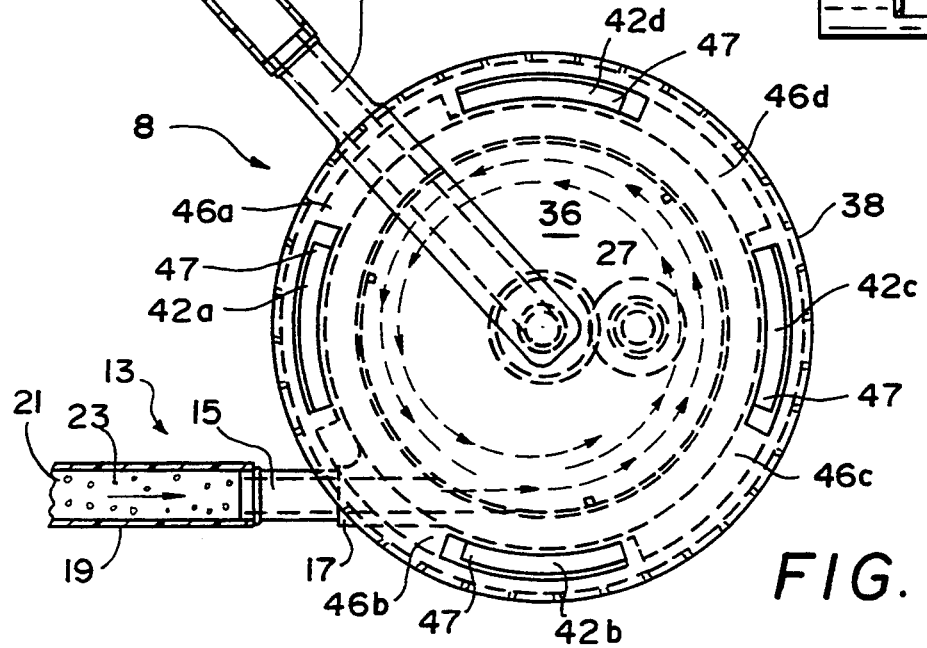
FIG. 2 is a plan view of the air-oil separator illustrated in FIG. 1.

With reference now to FIGS. 1 and 2, wherein like numerals designate like components throughout all of the several figures, the air-oil separator 1 of the invention comprises a housing assembly 3 having a cylindrical sidewall 5, and a bottom wall 6. To cover the open top end of the cylindrical sidewall 5, a assembly 8 is provided.

The housing assembly 3 includes both a gas inlet 13 and a gas outlet 25 for admiring gases containing oil droplets, and discharging the filtered gas, respectively. The gas inlet 13 is formed from a nipple 15 connected to a tangentially disposed opening 17 in the upper portion of the cylindrical sidewall 5. A gas inlet tube 19 conducts crankcase ventilation gasses 21 having entrained oil droplets 23 into the nipple 15 of the inlet 13. The gas outlet 25 of the housing assembly comprises an outlet nozzle 27 mounted in the center of the lid assembly 8. The outlet nozzle 27 is a right-angled tube having a receiving end 29 concentrically disposed within the cylindrical sidewall 5 as shown, and a discharge end 31 radially oriented over the top wall 36 of the lid assembly 8. A gas outlet tube 33 is coupled to the discharge end 31 and conducts filtered ventilation gases to a draft robe or to the air filter of the internal combustion engine if the separator 1 forms a "closed-system" when combined with the standard components of the engine in which it is mounted.

Figure 4:
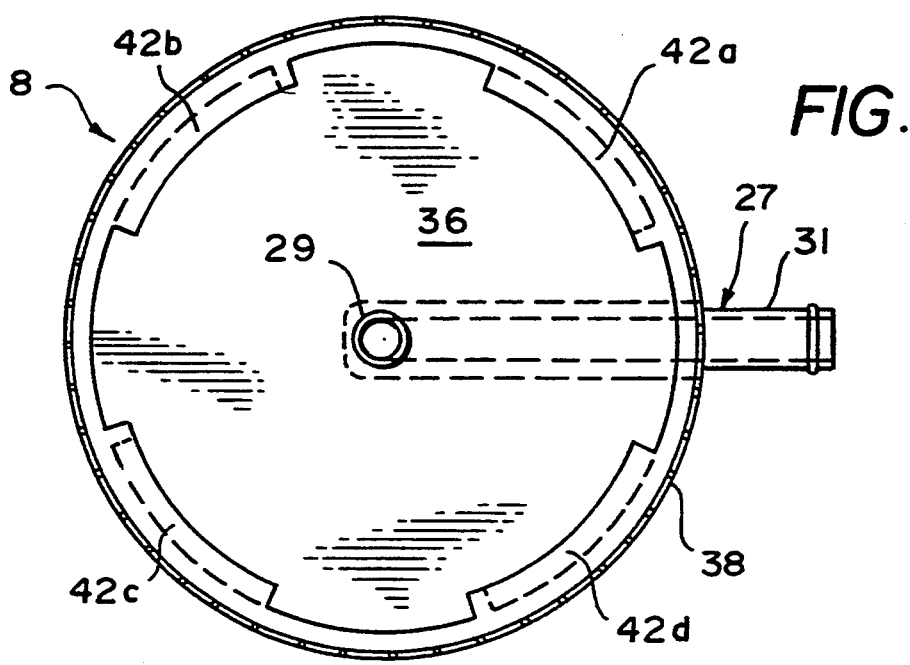
FIG. 4 is a plan view of the closure assembly illustrated in FIG. 3 along the line 4—4.

With reference now to FIGS. 1, 2 and 4, the lid assembly 8 includes a flat circular wall 36 surrounded by a circumferential flange 38. Grip ridges 40 are provided for facilitating the installation and removal of the lid assembly 8 by way of a twisting operation by the hand of an operator. The underside of the circular wall 36 includes four arcuate, ramp-shaped cam members 42a–d for providing a means of attachment between the lid assembly 8 and the upper flange to the cylindrical sidewall. The cam members 42a–d are uniformly spaced at 90° intervals around the periphery of the flat circular wall 36. Moreover, these cam members 42a–d may be wedged under four uniformly spaced flange members 46a–d disposed around the periphery of the upper edge 44 of the cylindrical sidewall 5 in order to secure the lid assembly 8 to the sidewall 5. To perform this operation, the arcuate cam members 42a–d are placed in between the flange members 46a–d as is shown in FIG. 2. Next, the user merely twists the lid assembly 8 counterclockwise so that the lower ends 47 of the arcuate cam members 42 can slide under the flange members 46a–d and wedgingly secure the lid assembly 8 over the upper edge 44 in "bayonet-type" fashion.

With reference now to FIGS. 1, 3, and 5, the interior of the housing assembly 3 contains a filtration material 51 for removing entrained oH droplets in the stream of air admitted through the gas inlet 13. The filtration material 51 is preferably a loosely-packed fibrous material that is inert to oil and the combustion products typically contained within the ventilation exhaust of an engine crankcase. Examples of such filtration materials include steel wool, brass wool, and fibrous plastic materials such as those used in plastic scrub pads. The filtration material should have a relatively low density, and relatively low surface per volume ratio so as not to excessively obstruct the gases that are directed through it. In this last regard, the fibrous plastic material used in Chore Girl ® scrub pads is a preferred filtration material.

The housing assembly 3 further contains a frustroconical wall assembly 53 for advantageously defining both a helical flow path and a double-back path for ventilation gases admitted through the inlet 13. The wall assembly 53 includes a tapered, conical wall 55 having a large-diametered end surrounded by an annular flange 59, and a small-diametered end that terminates in a free edge 69. The annular flange 59 is provided with a groove 61 on its upper surface for receiving an O-ring 63. Similarly, the upper edge 44 of the cylindrical sidewall 5 includes a groove 66 for receiving another O-ring 68. The purpose of the O-rings 63 and 68 is to provide a gas tight seal between the annular flange 59 of the frustro-conical wall assembly 53 and the lid assembly 8 when the latter is firmly screwed into the position illustrated in FIG. 1. As may best be appreciated with respect to FIGS. 1 and 3, the free edge 69 located at the small-diametered end of the frustro-conical wall assembly 53 defines a gas outlet 70 that conducts gas that has traveled through the filter medium 57 up into the receiving end 29 of the nozzle 27 of the gas outlet 25. The outside of the tapered, conical wall 55 and the opposing inner surface of the cylindrical sidewall 5 of the housing assembly 3 form a tapered, annular chamber 71 which defines a helical flow path through the filtration material 51 for the ventilation gasses admitted through the gas inlet 13. The inside of the tapered, conical wall 55 forms a diverging chamber that promotes a double-back or tortuous flow path for gasses that flow through the gas outlet 25 toward the receiving end 29 of the gas outlet 25.

With reference now to FIGS. 1, 3, and 6, a perforated plate 74 is provided at the lower portion of the housing assembly 3 for confining and supporting the filtration material 51, as well as for defining an oil collection reservoir 82. The outer diameter of the perforated plate 74 is slightly smaller than the inner diameter of the cylindrical sidewall 5, and includes a plurality of uniformly spaced perforations 76 for allowing the passage of oil or other liquids that coalesce and drain down from the filtration material 51, the cylindrical sidewall 5, and the conical wall 55. The perforated plate 74 is supported in a spaced relationship over bottom wall 6 of the housing assembly 3 by means of a central standoff 78, and a plurality of edge standoffs 80a,b. The space between the perforated plate 74 and the bottom wall 6 defines an oil collection reservoir 82 for oil that has been filtered out of the ventilation gases admitted through the inlet 15.

With reference in particular to FIG. 1, an oil drain assembly 84 is provided to drain the oil which collects within the reservoir 82 out of the housing 3, and into the oil pan 96 (shown in schematic) of an internal combustion engine. To this end, the oil drain assembly 84 includes a drain opening 86 in the bottom wall 6 over which a drain nipple 88 is mounted. A drainage tube 90 is provided having an upper end which is coupled to the lower end of the drain nipple 88 as shown. The lower end 94 of the drainage tube 90 is disposed in the oil pan 96 of the engine at a level which is lower than the operating oil level 98 within the pan 96. Such a disposition of the lower end 94 of the drainage tube 90 insures unimpeded drainage of oil out of the housing assembly 3 and into the oil pan 96.

In operation, ventilation gases from the crankcase of an internal combustion engine are introduced under a small positive pressure of about 2 to 18 inches of water through the gas inlet tube 19. These gases in turn pass through the tangentially disposed opening 17 in the cylindrical sidewalls 5, where they initially adopt a circular path as is shown by the flow arrows in FIGS. 1, 2, and 3. Continuous pressure forces the oil-entrained ventilation gases to adopt a roughly helical flow path through the filtration material 51 disposed in the annular chamber 71 defined between the tapered, conical wall 55 and the inner surface of the cylindrical sidewalls 5. In this helical path, oil droplets 23 are removed from the gases 21 both due to impingement against me fibers that make up the filtration material 51, as well as by centrifugal forces that cause the droplets 23 to collide against the portion of the inner surface of the cylindrical sidewall 5 that opposes the outside surface of the conical wall 55.

As the stream of gas completes the helical path, back pressure forces it to make a hairpin turn upwardly through the gas outlet 70 defined by the free lower edge 69 of the frusto-conical wall 55. While a small percentage of the stream of gas flows axially directly into the receiving end 29 of the gas outlet 25, most of it diverges in conformance with the tapered shape of the inner surface of the conical wall 55, and does not flow out of the receiving end 29 until it has traveled a double-back path indicated by the looping flow arrows in FIGS. 1 and 3. The combination of the hairpin turn and double-back flow path causes still more centrifugal and inertial separation of oil droplets 23 from the flow of the ventilation gases 21. The filtered stream of gas ultimately enters the receiving end 29 of the gas outlet 25, where it is conducted to the draft tube or to the air filter of the engine via gas outlet robe 33 in the manner previously described. In the meantime, filtered oil collects in reservoir 82 and drains through tube 90, where it is reclaimed in the oil pan 96 to be used in the oil lubrication system of the engine.

What is claimed:

1. An air-oil separator for separating oil droplets entrained in air circulating within a portion of an internal combustion engine, comprising:
   a housing having an inlet for receiving a stream of air having oil droplets entrained therein, and an outlet for discharging a stream of air;
   a filtration material disposed within the interior of said housing for separating said oil droplets from said stream of air, and
   annular chamber means for defined by a frustro-conically shaped wall having an exterior defining a helical flow path within said housing through said filtration material and between said housing inlet and outlet such that said oil droplets become separated from said air stream both by impingement against said filtration material and by centrifugal impingement against inner walls of said housing, and an interior for defining a double-back flow path for said oil-droplet laden air stream.

2. The air-oil separator of claim 1, wherein said inlet is mounted at an upper portion of said housing, and directs said air stream and droplets tangentially with respect to an inner wall of said housing.

3. The air-oil separator of claim 2, wherein said frustro-conically shaped wall includes an upper edge connected around said upper portion of said housing, and a free edge spaced apart from said housing outlet that admits said stream of air to said housing outlet.

4. The air-oil separator of claim 2, further comprising a pipe for conducting filtered air leaving said housing outlet into an air filter of an engine.

5. The air-oil separator of claim 1, further comprising a drain means fluidly connected to a lower portion of said housing for conducting oil collected from said air stream out of said housing.

6. The air-oil separator of claim 5, wherein said drain means includes an oil conducting conduit having a first end connected to said lower housing portion and a second end for connection with an oil pan of an engine at a level below an operative oil level in said pan to permit uninhibited drainage.

7. The air-oil separator of claim 6, wherein said housing includes a reservoir in its lower portion for collecting said separated oil, and wherein said first end of said oil conducting conduit is connected to said reservoir.

8. The air-oil separator of claim 1, wherein the pressure drop across the separator is 2–18 inches of water.

9. An air-oil separator for separating oil droplets entrained in air expelled from the vent tube of the crankcase of an internal combustion engine, comprising:
   a housing having an inlet mounted at an upper portion of said housing for receiving a stream of air expelled from said engine vent tube and directing it tangentially with respect to an inner wall of said housing, and an outlet for discharging filtered air;
   a filtration material disposed within the interior of said housing for separating said oil droplets from said stream of air, and
   annular chamber means defined by a frustro-conically shaped wall having an exterior for defining a helical flow path within said housing through said filtration material and between said housing inlet and outlet such that said oil droplets become separated from said air stream both by impingement against said filtration material and by centrifugal impingement against walls of said chamber, and an interior for defining a double-back flow path for said oil-droplet laden air stream, said wall having a larger-diametered end connected around an upper portion of said housing, and a smaller diametered end having a free edge that conducts air exiting said helical flow path to said housing outlet.

10. The air-oil separator of claim 9, wherein said smaller-diametered edge of said annular wall is spaced apart from said housing outlet in order to define a double-back path in a space defined by an inner surface of said annular wall for air exiting said helical path and flowing through said smaller-diametered edge portion.

11. The air-oil separator of claim 9, further comprising a drain means fluidly connected to a lower portion of said housing for conducting oil collected from the separation of said oil droplets from said air stream out of said housing.

12. The air-oil separator of claim 11, wherein said drain means includes an oil conducting conduit having a first end connected to said lower housing portion and a second end for connection to an oil pan of said engine at a level below an operating oil level in said pan to permit uninhibited drainage.

13. The air-oil separator of claim 12, wherein said housing includes a reservoir in its lower portion for collecting said separated oil, and wherein said first end of said oil conducting conduit is connected to said reservoir.

14. The air-oil separator of claim 13, further comprising a pipe for conducting filtered air leaving said housing outlet into an air filter of said engine.

15. The air-oil separator of claim 9, wherein the pressure drop across the separator is 2–18 inches of water.

16. The air-oil separator of claim 9, wherein the filtration material is formed from one of the group consisting of plastic scrub pad material, brass wool, and steel wool.

17. The air-oil seperator of claim 9, wherein the cross-section areas of said inlet and outlet are substantially the same.

18. A method for separating oil droplets entrained in a stream of air discharged from the vent tube of the crankcase of an internal combustion engine by means of a housing containing a filtration material and having an air inlet and air outlet on one end of said housing, comprising the steps of:

connecting said vent tube to said inlet of said housing;

directing said flow of oil droplet-laden air through said housing along a helical path through said filtration material from said one end of said housing to an opposite end thereof such that said oil droplets become separated from said air stream both by impingement against said filtration material and by centrifugal impingement against inner walls of said housing, and directing said flow of droplet-laden air along a double-back path within said housing from said opposite end to said one end and back from said one end to said opposite end before expelling said air out of said outlet to further remove oil droplet from said air.

19. The method defined in claim 18, further comprising the steps of collecting oil removed from said air stream and draining said oil into an oil pan of an engine.

20. The method defined in claim 19, wherein said oil is drained into said oil pan at a level lower than an operating level of oil in said pan to insure uninhibited drainage.

* * * * *